(12) United States Patent
Ku et al.

(10) Patent No.: US 11,755,815 B2
(45) Date of Patent: *Sep. 12, 2023

(54) SYSTEM AND METHOD FOR IMPROVING DESIGN PERFORMANCE THROUGH PLACEMENT OF FUNCTIONAL AND SPARE CELLS BY LEVERAGING LDE EFFECT

(71) Applicant: Taiwan Semiconductor Manufacturing Company Limited, Hsinch (TW)

(72) Inventors: Chun-Yao Ku, Taipei (TW); Jyun-Hao Chang, Kaoshiung (TW); Ming-Tao Yu, Hsinchu (TW); Wen-Hao Chen, Hsinchu (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/974,585

(22) Filed: Oct. 27, 2022

(65) Prior Publication Data

US 2023/0058814 A1  Feb. 23, 2023

Related U.S. Application Data

(63) Continuation of application No. 17/179,690, filed on Feb. 19, 2021, now Pat. No. 11,514,224, which is a
(Continued)

(51) Int. Cl.
*G06F 30/398* (2020.01)
*G06F 30/392* (2020.01)
*G06F 119/12* (2020.01)

(52) U.S. Cl.
CPC .......... *G06F 30/398* (2020.01); *G06F 30/392* (2020.01); *G06F 2119/12* (2020.01)

(58) Field of Classification Search
CPC .................................................... G06F 30/398
(Continued)

(56) References Cited

U.S. PATENT DOCUMENTS

5,461,576 A    10/1995    Tsay et al.
6,321,371 B1 *   11/2001    Yount, Jr. ........... H01L 27/0207
                                                                                       716/112
(Continued)

*Primary Examiner* — Eric D Lee
(74) *Attorney, Agent, or Firm* — Jones Day (57) ABSTRACT

Systems and methods for improving design performance of a layout design through placement of functional and spare cells by leveraging layout dependent effect(LDE) is disclosed. The method includes the steps of: importing a plurality of technology files associated with the layout design into an EDA system; importing a netlist associated with the layout design into the EDA system; importing a standard cell library containing pattern-S timing information of the functional cells and the spare cells; performing floorplan and spare cell insertion, wherein the spare cells are distributed uniformly across the floorplan; and conducting placement and optimization through re-placement of the at least one functional cells and the spare cells to form pattern-S with at least one timing critical cells to improve an overall timing performance of the layout design. According to some embodiments, conducting placement and optimization further includes: moving the at least one spare cells to locations to abut the at least one timing critical cells to form pattern-S for each of the at least one timing critical cells.

20 Claims, 10 Drawing Sheets

Related U.S. Application Data continuation of application No. 16/787,410, filed on Feb. 11, 2020, now Pat. No. 10,956,650.

(58) Field of Classification Search
USPC .......................................................... 716/134
See application file for complete search history.

(56) References Cited

U.S. PATENT DOCUMENTS

| | | |
|---|---|---|
| 8,266,566 B2 | 9/2012 | Hopkins et al. |
| 8,446,176 B1 | 5/2013 | Yang et al. |
| 8,661,391 B1 | 2/2014 | Viswanath et al. |

* cited by examiner

```
Enhanced library format
Cell : BUFFER
Pin(Z) {
index_1 ("0.019, 0.0523, 0.1111, 0.2385");      ← transition
Index_2 ("0.018, 0.2183, 0.0617, 0.1416");      ← loading
delay (
"0.265, 0.289, 0.324, 0.385",
"0.285, 0.308, 0.344, 0.404",                   ← cell delay
"0.321, 0.345, 0.380, 0.441",
"0.384, 0.408, 0.444, 0.505",
)
```
← 410

```
Enhanced library format with pattern-S
Cell : BUFFER
Pin(Z) {
index_1 ("0.019, 0.0523, 0.1111, 0.2385");
Index_2 ("0.018, 0.2183, 0.0617, 0.1416");
delay (
"0.265, 0.289, 0.324, 0.385",
"0.285, 0.308, 0.344, 0.404",
"0.321, 0.345, 0.380, 0.441",
"0.384, 0.408, 0.444, 0.505",
)
delay_context_aware {
"0.165, 0.189, 0.224, 0.285",
"0.185, 0.208, 0.244, 0.304",                   ← new cell delay considering pattern-S
"0.221, 0.245, 0.280, 0.341",
"0.284, 0.308, 0.344, 0.405",
}
```
← 420

SYSTEM AND METHOD FOR IMPROVING DESIGN PERFORMANCE THROUGH PLACEMENT OF FUNCTIONAL AND SPARE CELLS BY LEVERAGING LDE EFFECT

CROSS-REFERENCE TO RELATED APPLICATIONS

This application is a continuation of U.S. patent application Ser. No. 17/179,690, filed Feb. 19, 2021, entitled "System and Method for Improving Design Performance Through Placement of Functional and Spare Cells by Leveraging LDE Effect," which is a continuation of U.S. patent application Ser. No. 16/787,410, filed Feb. 11, 2020, now U.S. Pat. No. 10,956,650, issued Mar. 23, 2021, entitled "System and Method for Improving Design Performance Through Placement of Functional and Spare Cells by Leveraging LDE Effect," each of which is incorporated herein by reference in their entirety.

BACKGROUND

An integrated circuit (IC) is an electronic circuit manufactured into the surface of a thin substrate of semiconductor material. ICs are used in virtually all electronic equipment today and have revolutionized the world of electronics. Computers, mobile phones, and other digital home appliances are now inextricable parts of the structure of modern societies, made possible by the low cost of producing ICs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

An integrated circuit ("IC") is a set of electronic circuits on one typically small flat piece of semiconductor material that is often formed from substantially silicon. The integration of large numbers of tiny transistors into a small chip results in circuits that are orders of magnitude smaller, cheaper, and faster than those constructed of discrete electronic components. Integrated circuit layout, also known IC layout, or mask design, is the representation of an integrated circuit in terms of planar geometric shapes which correspond to the patterns of metal, oxide, or semiconductor layers that make up the components of the IC. Advances in IC technology, primarily smaller features and larger chips, have enabled the number of transistors in an integrated circuit to double every two years, a trend known as Moore's law.

As components get closer and closer together, those components start to have effects on one another. Often those interactive effects are detrimental to performance. Those effects are sometimes referred to as LDE's. Layout Dependent Effect, or LDE, refers to the performance variability effects in advanced process technologies when process geometrics are reduced. LDE include, for example, Shallow Trench Isolation (STI) and Well Proximity Effects (WPE). With LDE, it is observed that changing the IC layout has an impact on MOSFET device parameters and reliability. MOSFET, the metal-oxide-semiconductor field-effect transistor, is a type of FET (field-effect transistor) commonly fabricated by the controlled oxidation of silicon. MOSFET technology may include an insulated gate whose voltage determines the conductivity of the MOSFET device. MOSFET's ability to change conductivity with the amount of applied voltage is useful for amplifying or switching electronic signals. STI, also known as a box isolation technique, is an integrated circuit feature which prevents electric current leakage between adjacent semiconductor device components.

More specifically, STI is generally used on CMOS process technology nodes of 250 nanometers and smaller. CMOS, Complementary Metal-Oxide-Semiconductor, is a technology for constructing integrated circuits. CMOS technology is implemented in microprocessors, microcontrollers, static RAM, and other digital logic circuits. CMOS technology is also used in analog circuits such as image sensors (CMOS sensor), data converters, and highly integrated transceivers for many types of communications. STI is created early during the semiconductor device fabrication process, before transistors are formed.

In WPE, transistors that are close to a well (define well) edge have a different performance, mostly due to modified Vt, than ideally placed transistors. WPE can vary the transistor speed by up to ±10%.

EDA, or Electronic Design Automation, is also referred to as electronic computer-aided design (ECAD). EDA is a category of software tools for designing electronic systems such as integrated circuits and printed circuit boards. The EDA tools work together in a design flow that chip designers implement to design and analyze the entire semiconductor integrated circuit chips. EDA is a beneficial tool to IC designers because a modern semiconductor chip typically includes billions of components. Current digital flows are becoming increasingly modular. The front ends produce standardized design descriptions that compile into invocations of "cells" without regard to the cell technology.

Cells implement logic or other electronic functions using a particular integrated circuit technology. A cell in the context of electronic design automation (EDA) is an abstract representation of a component within a schematic diagram or physical layout of an electronic circuit in software. A cell-based design methodology is a technique that enables designers to analyze chip designs at varying levels of abstraction. One designer may choose to focus on the high level logical function, and another designer may focus on the low level physical implementation. The cell-based design technique also enables designers to reuse components in more complex designs without express consideration of all of the low level implementation details. A standard cell is a group of transistor and interconnect structures that, in one example, provides a Boolean logic function, e.g., AND, OR, XOR, XNOR, inverters, or a storage function (flip-flop or latch). The simplest standard cells are direct representations of the elemental NAND, NOR, and XOR Boolean function. In practice, standard cells of greater complexity can be implemented. Spare cells are cells without functionality, spare cells are also called filler cells which are added during design.

Fabricators generally provide libraries of components for their production processes, with simulation models that fit standard simulation tools. EDA software tools are available to help with placement of cells to provide a design that meets functional requirements and to help optimize that design (e.g., to minimize detrimental LDEs and as described further herein) to take advantage of potentially beneficial inter-cell effects.

Place and route, or P&R, is a stage in the design of IC and field-programmable gate arrays. P&R may include two steps, namely placement and routing. The first step, placement, involves deciding where to place all electronic components, circuitry, and logic elements in an increasingly limited space. Placement is followed by routing, which decides the exact design of all the wire connecting elements, e.g., needed to connect the placed components. This step implements desired connections while following the rules and limitations of the manufacturing process.

Performance of standard cells are recorded in a standard cell library and are pre-characterized assuming target standard cell is surrounded by filler cells. Due to LDE, in a place and route environment, the actual performance of standard cells may deviate from the recorded performance in the standard library. In advanced processes beyond 7 nm, the impact of LDE becomes increasingly significant to standard cells, in that, the performance of standard cells are more vulnerable to fluctuation due to the neighboring environment, and there is a greater performance difference between the actual performance on silicon and the performance recorded in the standard cell library.

Figure 1:
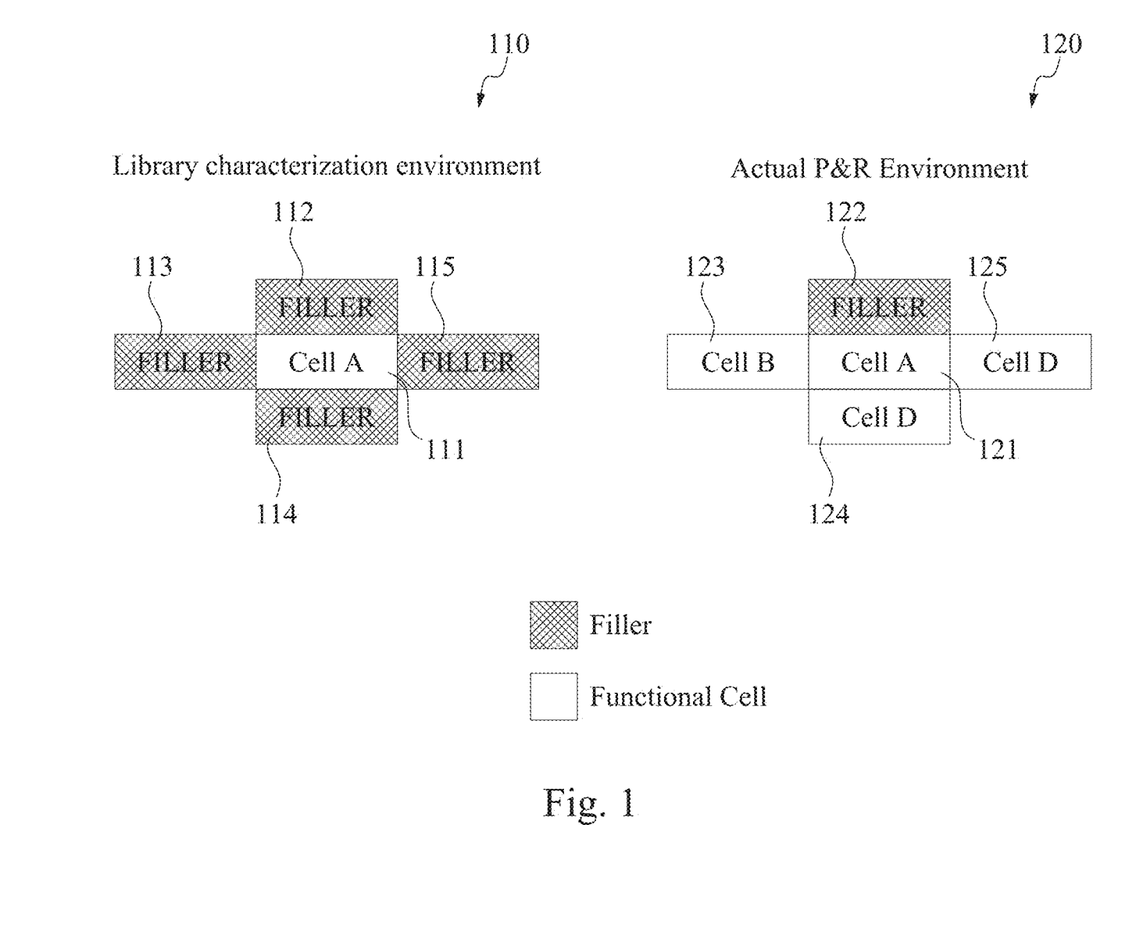
FIG. 1 defines a comparison between a library characterization environment and a P&R environment, in accordance with some embodiments.

FIG. 1 defines a comparison between a library characterization environment and an actual P&R environment, in accordance with some embodiments. The comparison in FIG. 1 facilitates further explanation of design performance improvement through placement of functional and spare cells by leveraging LDE effect in subsequent paragraphs. According to some embodiments, 110 illustrates a library characterization environment for a standard cell 111. In the recorded standard cell library, the standard cell 111 is surrounded by neighboring fillers 112, 113, 114 and 115 located to the top, left, bottom and right of the standard cell 111, respectively. In an actual P&R environment 120, the standard cell 121 may face an environment different from what is recorded in the standard cell library 110. In the actual P&R environment 120, the standard cell 121 is surrounded by, for example, only one filler 122 to the top of the standard cell 121. Other standard cells 123, 124 and 125 are placed to the left, bottom and right of the standard cell 121, respectively. The standard cell 111's behavior in this default environment 110 is stored in the standard cell library. According to the LDE discussed above, the layout in 120 has an impact on the performance of the standard cell 121 as compared to the layout 110 in timing, power and other aspects, especially in advanced node technology approaching and beyond 7 nm. The performance characterizations recorded in the standard cell library likely does not properly reflect the actual performance of the standard cell 121 in the actual layout 120. It may be beneficial to add corresponding characterizations to the standard cell library for the layout 120 for future reference when the same layout is encountered in future P&R. Thus the standard cell library characterization may in one embodiment be expanded to cover more and more layouts encountered in the actual P&R to facilitate future designs. The actual P&R environment 120 is only an example layout for illustrative purpose, P&R environments may cover any other possible layouts encountered in the actual designs.

While certain cell arrangements can have adverse effects compared to default arrangements with filler cell buffers, certain arrangements can provide performance enhancements. For example, certain ways of abutting cells improve the speed of an integrated circuit. For example, abutting a cell with a larger active region height with a cell with a smaller active region height increases the speed of the abutting cells with larger active region height due to effects such as RC effect. One such arrangement is referred to herein as pattern-S, where cells are arranged during P&R to match pattern-S where possible to take advantage of such performance boosts. In semiconductor design and manufacturing, standard cells can contain different heights of active region. Standard cells with taller active region imply that there are more conducting devices, such as fins, nanosheets and nanowires, which can be implemented to improve design performance. Standard cells with shorter active region imply that there are less conducting devices, such as fins, nanosheets and nanowires, which can be implemented to save power. When standard cells with different active region heights abut, it has been found that the standard cell having a taller active region tends to having better conductivity, providing an opportunity for a speed up of that standard cell. Such patterns are sometimes referred to as pattern-S. It is well-known to one skilled in the art that pattern-S can benefit surrounding cells by increasing the performance of corresponding surrounding cells.

P&R software undergoes extensive updates with each new node transition, but the changes have typically impacted the router and DRC ("design rule checking") checker to handle new and more complex routing rules. The following discussions regarding new metal/via layer rules related to active region jog are known to an artisan skilled in the art. Silicon dioxide is used as masking material or as diffusion barrier in multilayer device structures. Compared to single crystal silicon the diffusivities of impurities in oxide is extremely low for almost all common dopants. Certain cells have larger active region height than others. In advanced process, new types of design rule checking ("DRC") and constraints emerge. Such new design rules and constraints include, for example, sub-metal rules. The difference in active region heights is a result of the difference in the number of conducting devices including: fins, nanosheets and nanowires. For example, a larger number of fins, nanosheets and nanowires can result in a larger active region height. DRC errors on sub-metal layers include at least three types: the first type, width, spacing and area design rule checking on implant layers; the second type, active region jog rule checking on the active region layer; and the third type, prohibited drain-drain rule checking. In advanced technology, two new types of sub-metal rules were added: minimum-jog, or a min-jog, and drain-drain abutment. Min-jog violations usually apply to the active region (active region) layer. When the horizontal active region edge is too short, there is a min-jog violation, which can be fixed by inserting a matching cell to the cell in the middle or inserting a gap that will be filled later.

Figure 2A:
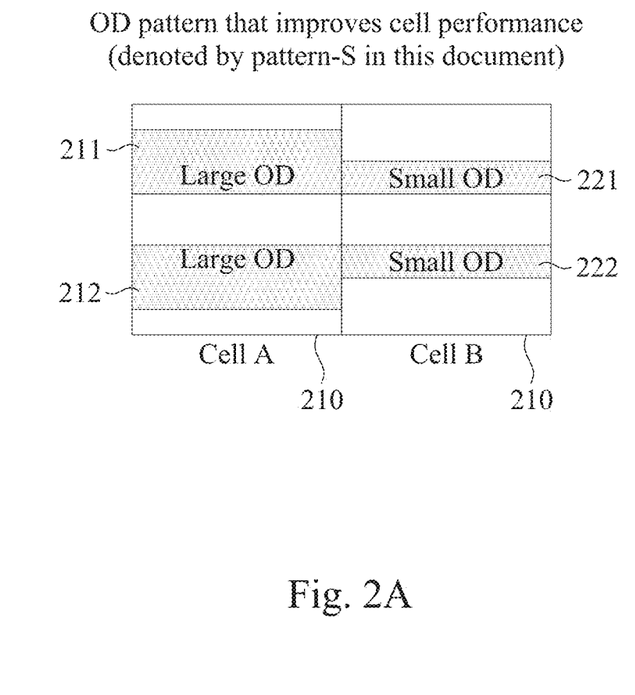
FIG. 2A illustrates active region patterns and a pattern-S in cell abutment and their impact on cell performance improvement, in accordance with some embodiments.

FIG. 2A illustrates active region patterns and a pattern-S in cell abutment and their impact on cell performance improvement, in accordance with some embodiments. The illustrated active region pattern, with a pattern-S cell abutment, illustrates design performance improvement that can be achieved through placement of functional and spare cells in a manner that leverages the LDE effect as described below. According to some embodiments, a cell 210 is abutted to another cell 220 on the left, for example. According to some embodiments, the cell 210 has active region (active region) patterns 211 and 212. According to some embodiments, the cell 220 has active region patterns 221 and 222. active region patterns 211 and 212 have larger active region height compared to active region patterns 221 and 222. Standard cells can have different active region region heights by design to provide desired functionality and drive strength. When cells with different active region heights abut, active region jogs can result. According to some embodiments, design rules include minimum implant width, diffusion jogs and drain-drain abutment. According to some embodiments, when a cell with larger active region height is abutted with a cell with smaller active region height, the timing performance of the cell with the larger active region height is improved. For example, the cell 210 has larger active region heights 211 and 212 compared to active region heights 221 and 222 in the cell 220. As a result, the timing performance of the cell 210 is improved compared to its standard cell library characterization, while the timing performance of the cell 220 may in some embodiments remain unchanged compared to the standard cell library characterization. Accordingly, in P&R, there is a performance advantage in abutting standard cells with larger active region heights to standard cells with smaller active region heights. The timing performance of standard cells with larger active region heights are improved without sacrificing the timing performance of other standard cells, therefore, the overall timing performance of the P&R is improved. According to some embodiments, the cell 210 is abutted to the cell 220 on the right. According to some embodiments, the cell 210 is abutted to the cell 220 on the top. According to some embodiments, the cell 210 is abutted to the cell 220 on the bottom. According to some embodiments, the pattern illustrated in FIG. 2A, where a standard cell with larger active region height abuts another standard cell with smaller active region height, is called a pattern-S. The pattern-S is not limited to the specific configuration illustrated in FIG. 2A. The pattern-S is not limited to sideway abutting. According to some embodiments, performance enhancement can be gained through other ways of abutting, for example but not limited to vertical abutting. In vertical abutting, one cell is on the top or bottom of another cell, instead of left or right. According to some embodiments, the pattern-S is desirable in P&R in improving IC performance. According to some embodiments, creating the pattern-S by moving cells and fillers to appropriate locations in P&R achieves performance improvement compared to the standard cell library characterizations.

Figure 2B:
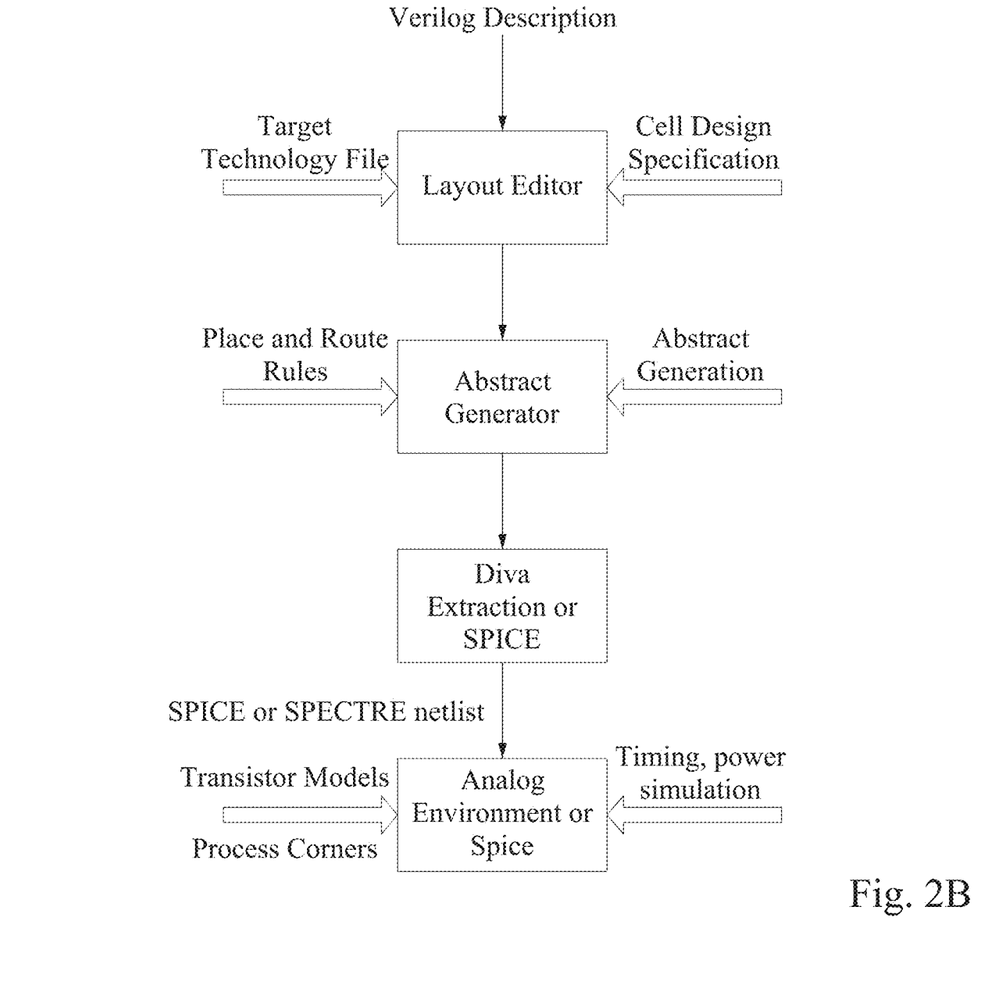
FIG. 2B illustrates the implementation of standard cell library in layout design, in accordance with some embodiments.

FIG. 2B illustrates the implementation of standard cell library in layout design, in accordance with some embodiments. According to some embodiments, standard cell libraries are included with a CAD tool for chip design. Standard cell libraries contain primitive cells required for digital design, in addition, more complex cells that have been specially optimized can also be included in the standard cell libraries. In order to produce a functionally correct design that meets all the specifications and constraints, a combination of different tools are required in the design flows. These tools require specific information in different formats for each of the cells in the standard cell library provided to them for the design. According to some embodiments, as illustrated in FIG. 2B, the layout editor accepts cell design specifications and target technology file as input, which include, according to some embodiments, specific design standards, constant height, offsets etc. According to some embodiments, Verilog is required for dynamic simulation and Verilog description supports back annotation of timing information. According to some embodiments, transistor and interconnect parasitic are extracted using Cadence or other extraction tools (SPACE). According to some embodiments, a Spice or Spectre netlist is generated and detailed timing simulations are performed. According to some embodiments, data is formatted into a TLF file including process, temperature and supply voltage variations. According to some embodiments, logical information for each cell is also contained in the TLF file. According to some embodiments, Cadence tools are implemented, other software tools are implemented similarly.

Figure 3:
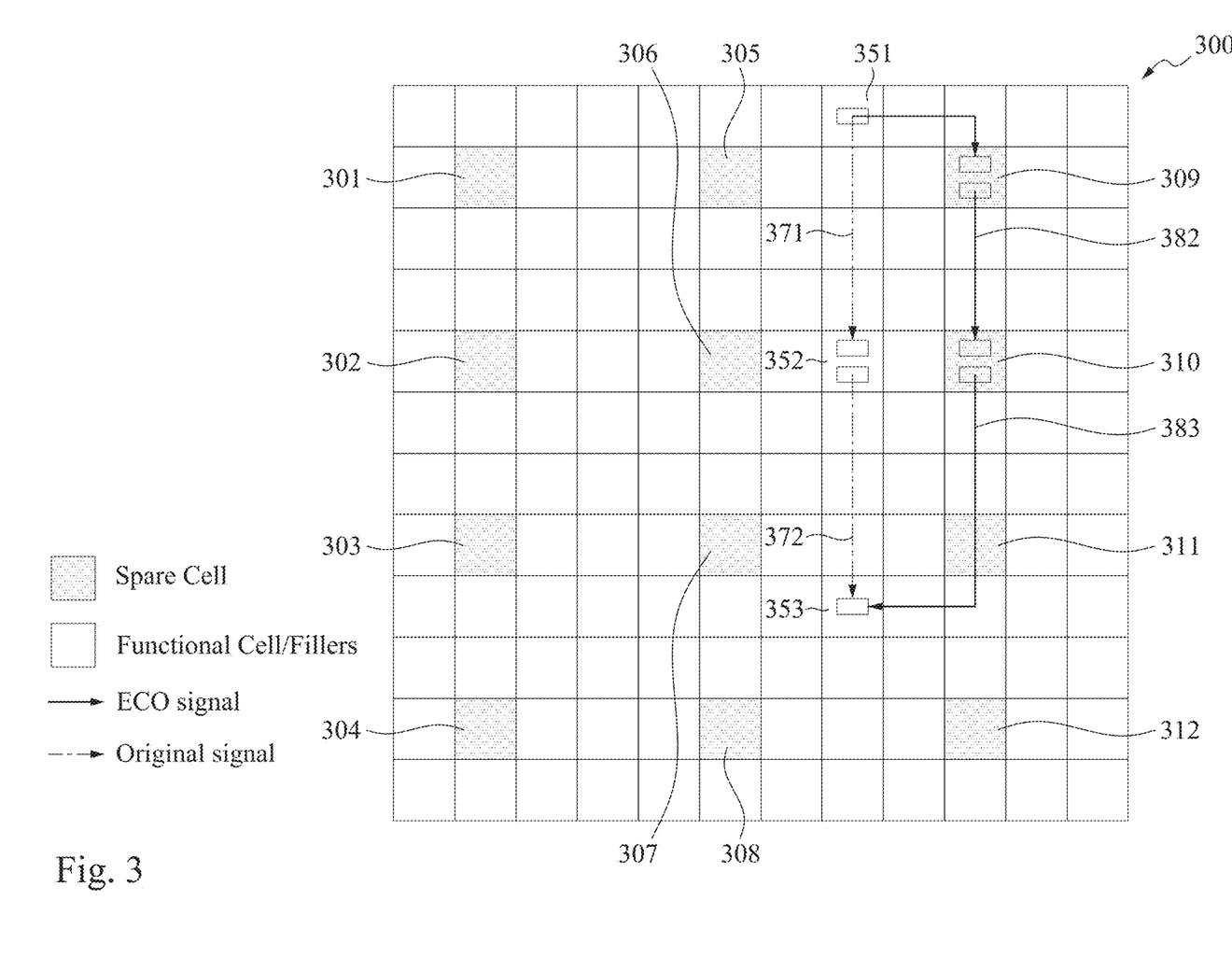
FIG. 3 illustrates a deployment and usage of spare cells, in accordance with some embodiments.

FIG. 3 illustrates a deployment and usage of spare cells, in accordance with some embodiments. The illustration of deployment and usage of spare cells facilitates further explanation of design performance improvement through placement of functional and spare cells by leveraging LDE effect in subsequent paragraphs. According to some embodiments, spare cells are frequently implemented in IC design to minimize engineering change orders (ECO) in FEOL (front-end of line) layers to save cost by avoiding re-design of base layers. According to some embodiments, spare cells are uniformly distributed across the chip and are left floating to cover potential ECO changes in any location of the design. According to some embodiments, when ECO is needed, designer can re-connect signals to nearby spare cells to change functionality instead of re-design base layers.

When ECO changes are not needed, then the spare cells are left idle without affecting the design. According to some embodiments, a design 300 includes 12 by 12 cells and/or fillers, with 12 spare cells 301, 302, 303, 304, 305, 306, 307, 308, 309, 310, 311 and 312 illustrated as gray boxes. The rest of the boxes are functional cells and/or fillers. As illustrated, for example, a signal is originally directed from a cell 351 through a wire 371 to a cell 352, then through a wire 372 to a cell 353. According to some embodiments, if due to various reasons, for example, defects in the original wiring, or difficulty in manufacturing, the signal from the cell 351 to the cell 353 needs to be re-routed without re-designing of the base layer, spare cells 309 and 310 in the neighboring area are utilized. As illustrated, according to some embodiments, the signal is re-routed from the cell 351 to the spare cell 309 through a wire 381, then through a wire 382 to the spare cell 310, then through a wire 383 to the destination cell 353. As discussed above, re-routing is achieved without re-designing the base layer. As noted above, a standard cell library contains operating characteristics of a cell and that a cell positioned in a pattern-S arrangement can have improved performance.

Figure 4A:
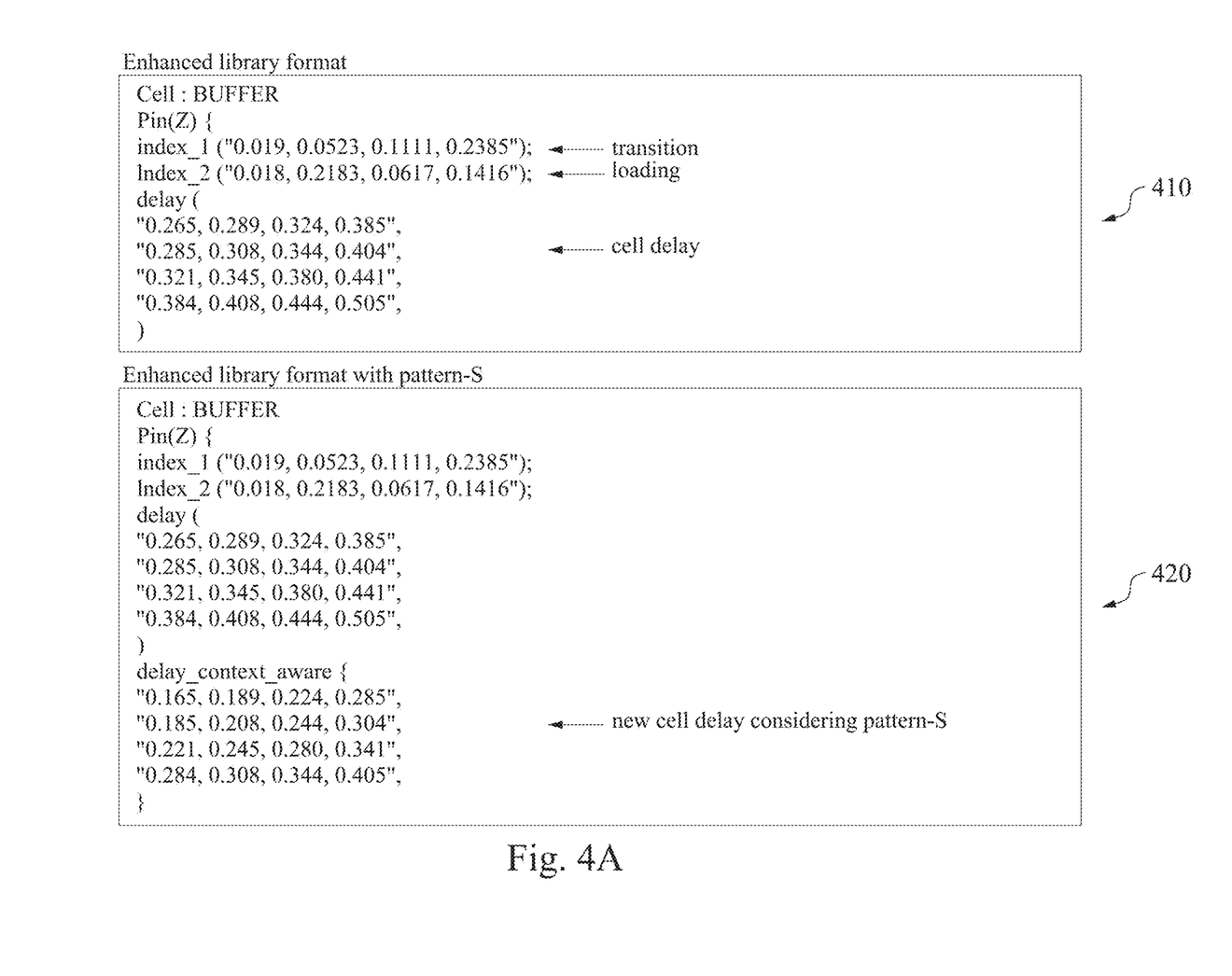
FIG. 4A illustrates a modification of library format with a pattern-S, in accordance with some embodiments.

FIG. 4A illustrates the modification of a library entry for a cell with a pattern-S, in accordance with some embodiments. The illustration of the modification of a library entry for a cell with a pattern-S facilitates further explanation of design performance improvement through placement of functional and spare cells by leveraging LDE effect in subsequent paragraphs. According to some embodiments, as discussed above, design performance can be improved through the placement and replacement of functional cells and spare cells by leveraging LDE and the pattern-S. According to some embodiments, the standard cell library contains two sets of timing information. The first set contains timing information without consideration of pattern-S, and the second set contains timing information with consideration of pattern-S. According to some embodiments, by adding the second set of timing information to the standard cell library, P&R tools is able to optimize the circuit design through application of both sets of cell timing information based on cell abutment. According to some embodiments, timing performance is improved through the placement and replacement of functional cells, as discussed above, the P&R tool attempts to form the pattern-S through minor refinement of standard cell placement in local neighboring regions without inducing negative disturbance in timing. According to some embodiments, if the P&R tool also attempts to form the pattern-S with standard cells in longer ranges in global scales, larger re-placement of standard cells are induced, and as a result, the timing performance of the displaced cells may degrade. According to some embodiments, to avoid the timing penalty induced by long range re-placement of standard cells, spare cells are displaced without triggering timing penalty because spare cells may not have any physical connections. According to some embodiments, spare cells are moved to form the pattern-S in P&R. According to some embodiments, the existing standard cell library is enhanced by including additional timing information incurred by the pattern-S. According to some embodiments, the existing library format 410 includes only one set of timing information data structure named "delay." As a comparison, according to some embodiments, the enhanced library format with the pattern-S 420 includes an additional timing data structure named "delay context aware" which contains timing information incurred by the pattern-S. The data in FIG. 4A are for illustrative purpose only and does not reflect any actual implementation.

Figure 4B:
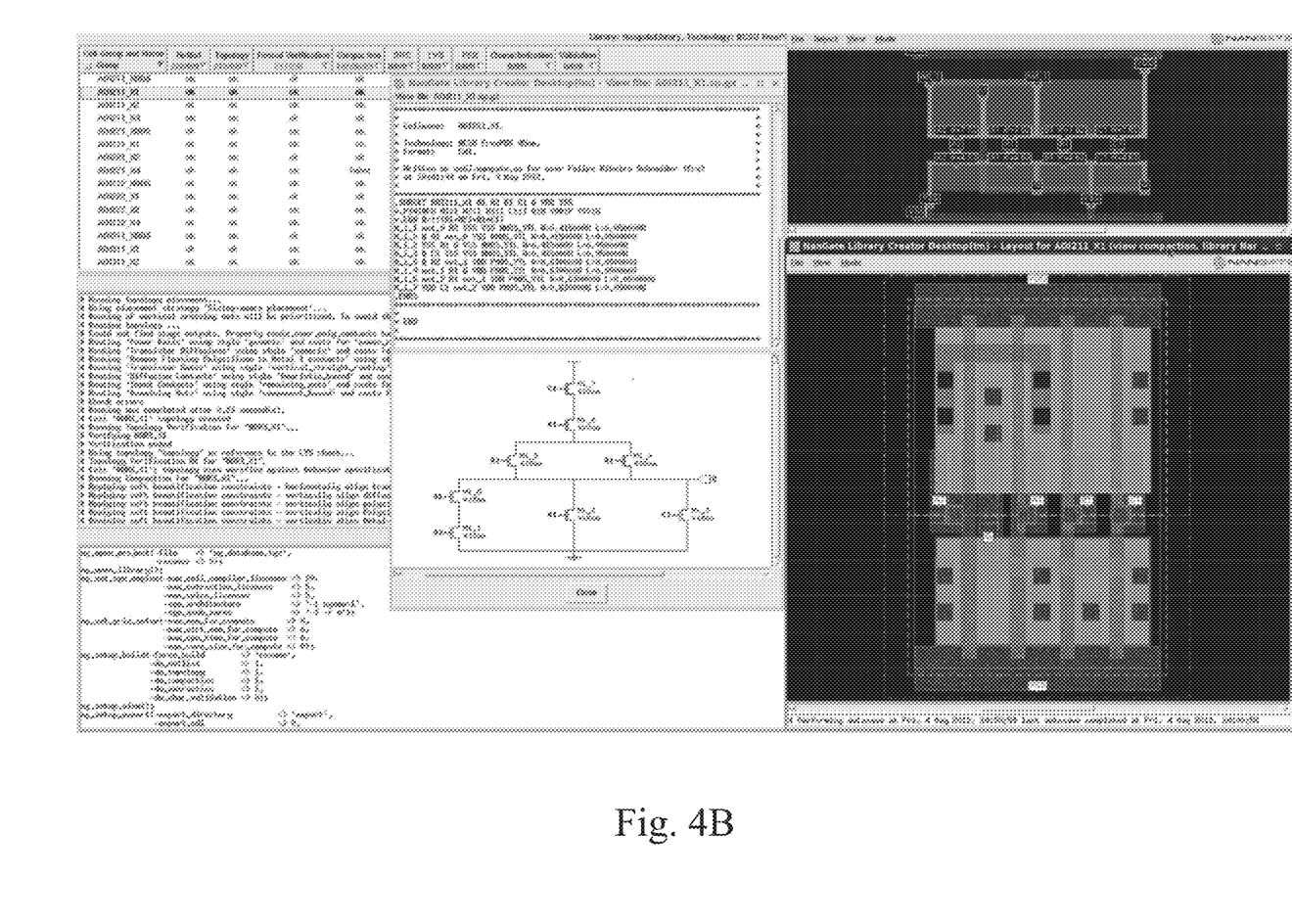
FIG. 4B illustrates a topological view of a cell structure corresponding to the file view of the cell in the cell library, in accordance with some embodiments.

FIG. 4B illustrates a topological view of a cell structure corresponding to the file view of the cell in the cell library, in accordance with some embodiments. The illustration of a topological view of a cell structure corresponding to the file view of the cell in the cell library facilitates further explanation of design performance improvement through placement of functional and spare cells by leveraging LDE effect in subsequent paragraphs. As an example, the left is a file view of a cell in the cell library, the right is the corresponding topological view of the same cell depicted on the left. According to some embodiments, the cell files 410 and 420 in FIG. 4A both have corresponding topological views. Parameters and requirements are created and edited in the file view on the left, and topological view renders the graphical structure of the cell in actual implementations on the left. According to some embodiments, when edits and changes are made in the file view on the left, the topological view changes on the right with respect to the corresponding elements affected by the edits and changes.

Figure 5:
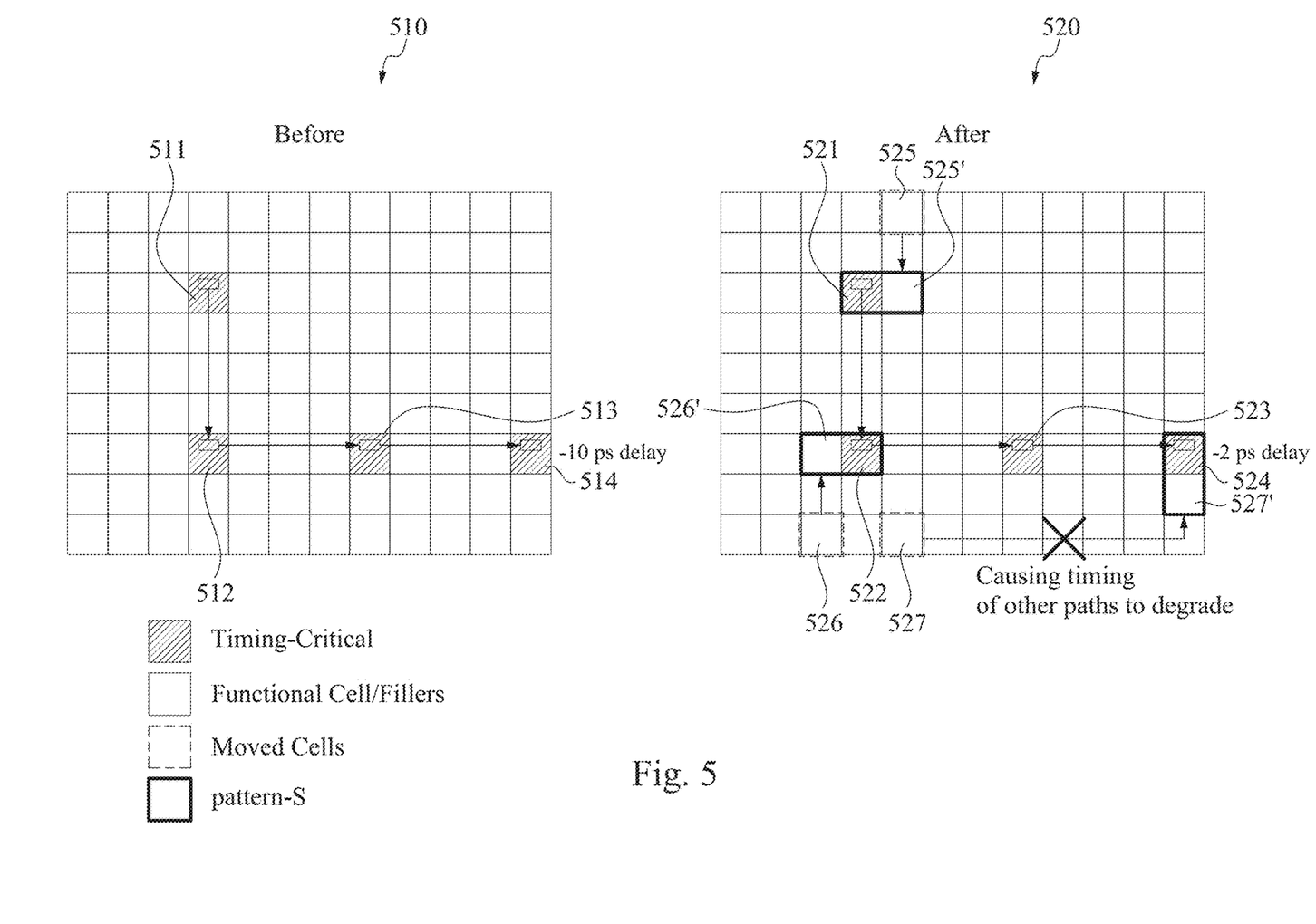
FIG. 5 illustrates performance optimization with functional cells re-placement, in accordance with some embodiments.

FIG. 5 illustrates performance optimization with functional cells re-placement, in accordance with some embodiments. The illustration of performance optimization with functional cells re-placement facilitates detailed explanation of design performance improvement through placement of functional and spare cells by leveraging LDE effect. In FIG. 5, a design 510 is an original design before re-placement of functional cells, as a comparison, a design 520 is a design after re-placement of certain functional cells to improve timing performance. According to some embodiments, in the design 510, a signal is routed from a first timing critical cell 511 to a second timing critical cell 512, then routed to a third timing critical cell 513, then routed to a fourth timing critical cell 514, the overall delay along this route is estimated to be 10 ps, for example. As a comparison, according to some embodiments, in the design 520, a first functional cell 525 is moved two blocks away to 525', to abut the first timing critical cell 521 to form a pattern-S. Similarly, a second functional cell 526 is moved two blocks away to 526', to abut the second timing critical cell 522 for form another pattern-S. The re-placement of both functional cells 525 and 526 are relatively short and are confined in their respective local neighborhoods, as a result, overall improvement in timing performance is achieved without incurring timing penalty. When the EDA tool attempts a longer re-placement of a functional cell out of its local neighborhood, timing of other paths may be degraded thus incurring overall timing penalty for the entire design. For example, when the EDA attempts to move a third functional cell 527 eight blocks away to 527' to form a pattern-S with the fourth timing critical cell 524, timing of other paths may be degraded. As a result, the third functional cell 527 is prohibited from moving to 527'. According to some embodiments, the overall delay of the design 520 is only 2 ps, for example, without re-placement of 527, and overall performance improvement is achieved. According to some embodiments, for example, performance optimization can include steps of re-arranging spare cells, or functional cells, or both functional and spare cell using the EDA tool to improve the performance of a circuit design.

Figure 6:
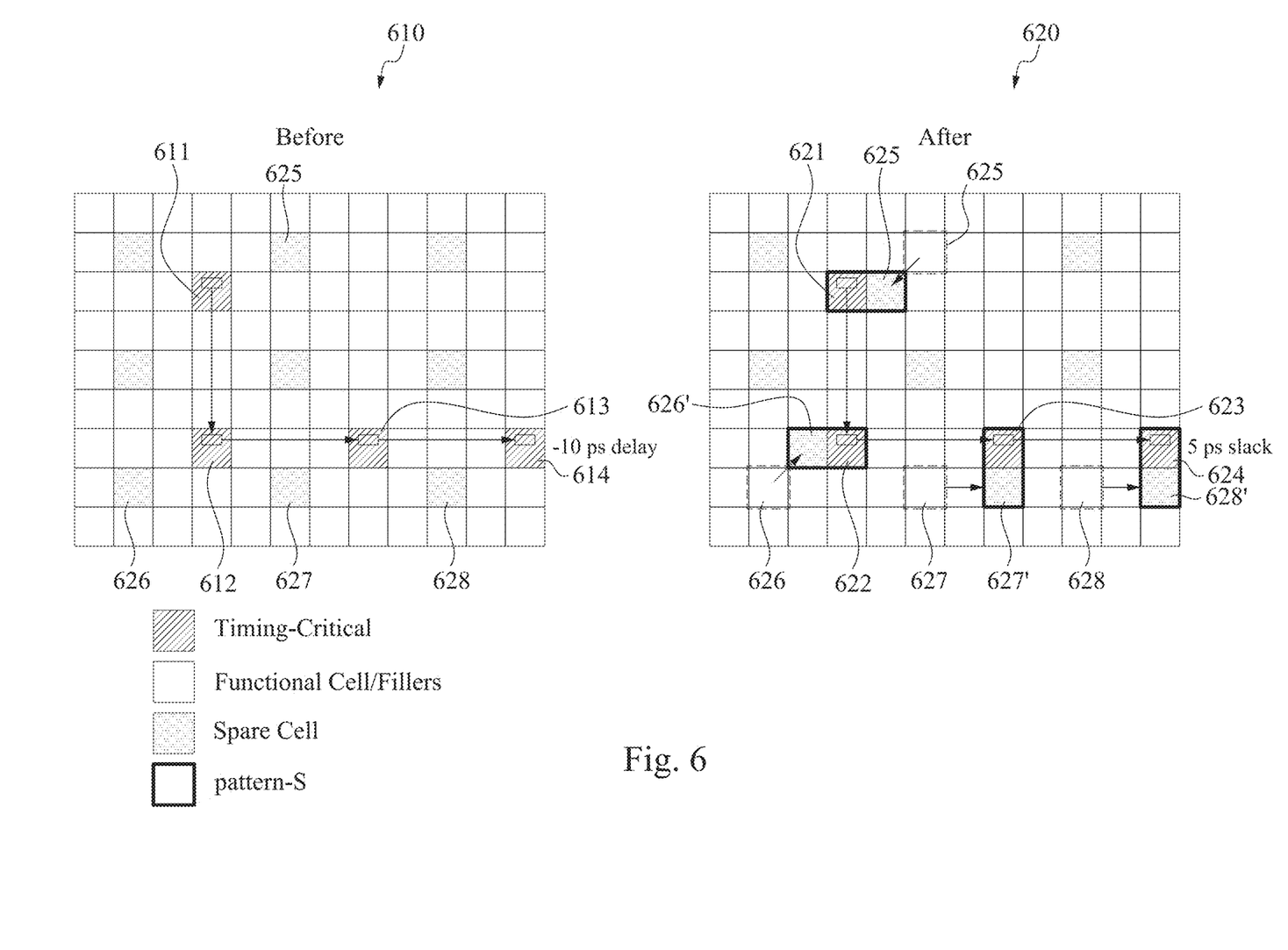
FIG. 6 illustrates performance optimization with space cells re-placement, in accordance with some embodiments.

FIG. 6 illustrates performance optimization with space cells re-placement, in accordance with some embodiments. According to some embodiments, in a design 610, nine spare cells are uniformly distributed across the layout, and a signal is routed from a first timing critical cell 611 to a second timing critical cell 612, then to a third timing critical cell 613, then to a fourth timing critical cell 614. In a design 620, instead of moving functional cells as illustrated in FIG. 5, a plurality of spare cells are moved to achieve performance improvement. According to some embodiments, for example, a first spare cell 625 is moved to 625' to abut the first timing critical cell 621 to form a first pattern-S, a second spare cell 626 is moved to 626' to abut the second timing critical cell 622 to form a second pattern-S, a third spare cell 627 is moved to 627' to abut the third timing critical cell 623 to form a third pattern-S, a fourth spare cell 628 is moved to 628' to abut the fourth timing critical cell 624 to form a fourth pattern-S. As discussed above, the re-placement of these spare cells does not incur any timing penalties to the overall design, all four spare cells can be moved to form four pattern-S to improve the overall timing performance.

Figure 7:
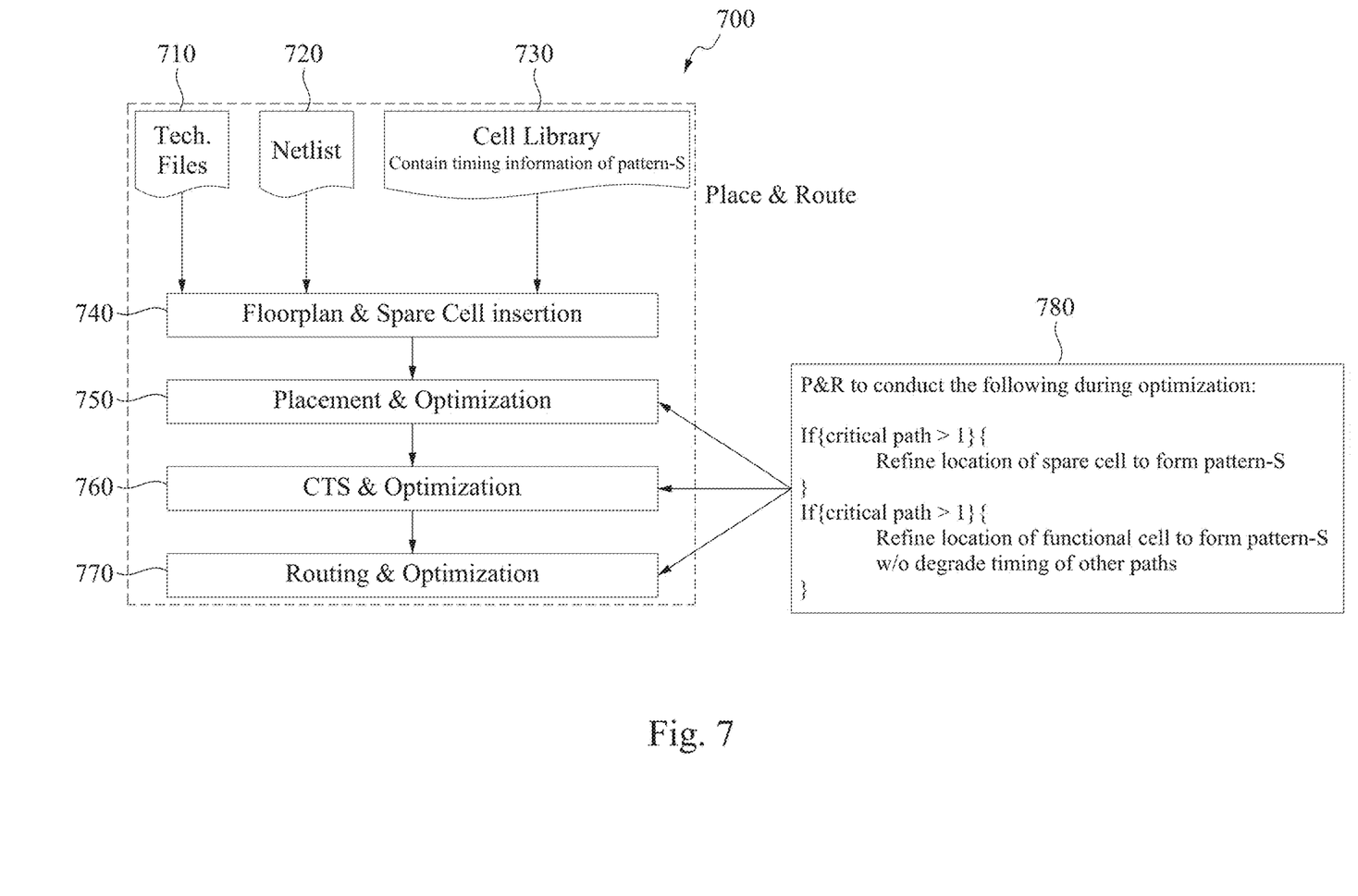
FIG. 7 is a diagram illustrating a method of improving design performance through placement of functional and spare cells by leveraging LDE, in accordance with some embodiments.

FIG. 7 is a diagram illustrating a method of improving design performance through placement of functional and spare cells by leveraging LDE, in accordance with some embodiments. According to some embodiments, the method of improving design performance through placement of functional and spare cells by leveraging LDE 700 includes step 710, reading tech files into an EDA system, the tech files includes related tech specifications. At step 720, reading a netlist into the EDA system, the netlist include information regarding the relationship between the cells. At step 730, reading the cell library containing pattern-S timing information into the EDA system, the pattern-S timing data structure is illustrated in FIG. 6. Then at step 740, IC design floor plan and spare cells are inserted, as discussed above, the spare cells are uniformly distributed across the floor plan to facilitate later timing performance improvement through the re-placement of certain spare cells. In the next step 750, placement and optimization is performed. In the next step 760, clock tree synthesis and optimization is performed. According to some embodiments, when the clock tree is synthesized using the EDA, the EDA optimizes performance by re-arranging cells and other circuit component to yield a configuration that has the best performance compared to other alternative configurations. In the next step 770, routing and optimization is performed. In all three steps 750, 760 and 770 where optimization is involved, step 780 is conducted by the P&R. According to some embodiments, if a preset condition is met, for example: critical path>1, then spare cell locations are refined to form the pattern-S, as discussed above. According to some embodiments, if a preset condition is met, for example: critical path>1, then functional cell locations are refined to form the pattern-S without degrading timing of other timing paths, as discussed above.

Figure 8:
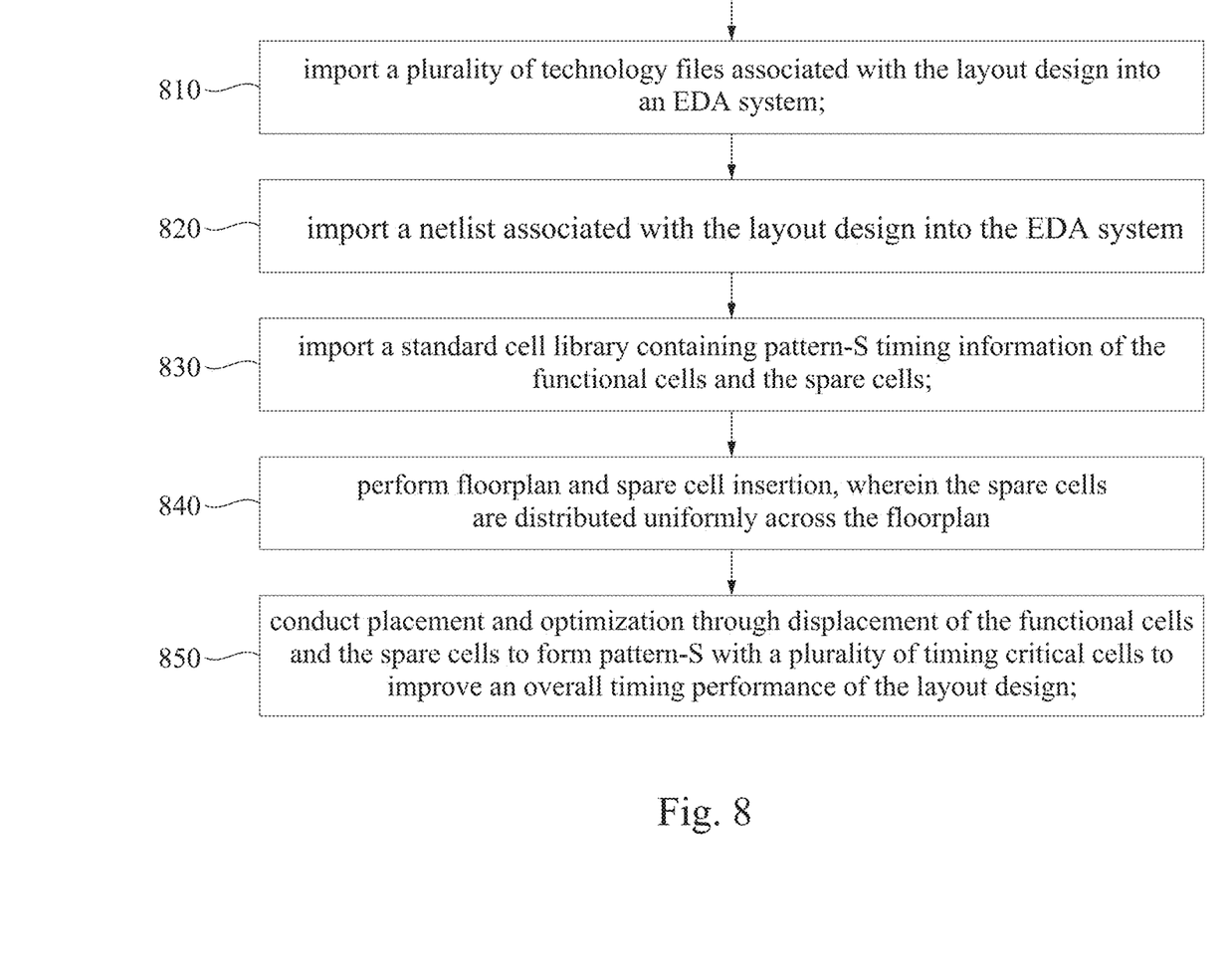
FIG. 8 is a flowchart illustrating method of improving design performance through placement of functional and spare cells by leveraging LDE, in accordance with some embodiments.

FIG. 8 is a flowchart illustrating the method of improving design performance through placement of functional and spare cells by leveraging LDE, in accordance with some embodiments. According to some embodiments, the method of improving design performance through locational placement of functional and spare cells by leveraging LDE includes step 810, importing a plurality of technology files associated with the layout design into an EDA system. The technology files include target technology information. The method includes the next step 820, importing a netlist associated with the layout design into the EDA system. Spice or Spectre netlist is generated and detailed timing simulations are performed. The method includes the next step 830, importing a standard cell library containing pattern-S timing information of the functional cells and the spare cells; The method includes the next step 840, performing floorplan and spare cell insertion, wherein the spare cells are distributed uniformly across the floorplan. And the method includes the next step 850, conducting placement and optimization through re-placement of the functional cells and the spare cells to form pattern-S with a plurality of timing critical cells to improve an overall timing performance of the layout design. Timing critical cells are cells whose deployment play critical roles in the timing of an integrated circuit, and the locational variation of the deployment of such timing critical cells relative to other cells changes the timing characteristics of the integrated circuit.

An example of the method of improving design performance through placement of functional and spare cells by leveraging LDE is using Cadence EDA software tools. Cadence include system design and verification, digital design and signoff, custom IC/Analog/RF design, IC package design and analysis, PCB design and analysis. Cadence includes standard cell libraries which are required by all CAD tools for chip design. For example, Cadence Virtuoso layout editor takes Verilog descriptions, technology files and cell design specifications and provide GDS II descriptions to Cadence abstract generator, which also takes place and route rules. The place and route rules are part of the technology files. Then the Cadence abstract generator provides LEF description to the Cadence Diva Extraction or SPACE, which in turn, provides SPICE or SPECTRE netlist to the Cadence analog environment. Cadence analog environment also take timing and power simulations, transistor models and process corners information. The placement of functional and spare cells by leveraging LDE is conducted by Cadence with the specified cell designs, technology files and place and route rules. Functional and spare cells are moved according to place and route rules by leveraging LDE.

According to some embodiments, a method for improving design performance of a layout design through placement of functional and spare cells by leveraging layout dependent effect (LDE) is disclosed. The method includes the steps of: importing a plurality of technology files associated with the layout design into an EDA system; importing a netlist associated with the layout design into the EDA system; importing a standard cell library containing pattern-S timing information of the functional cells and the spare cells, cells form pattern-S when cells of different active region heights are placed adjacent to each other; performing floorplan and spare cell insertion, wherein the spare cells are distributed uniformly across the floorplan; and conducting placement and optimization through re-placement of the functional cells and the spare cells to form pattern-S with a plurality of timing critical cells to improve an overall timing performance of the layout design. According to some embodiments, conducting placement and optimization further includes: moving the spare cells to locations to abut the plurality of timing critical cells to form pattern-S for each of the plurality of timing critical cells. According to some embodiments, conducting placement and optimization further includes: moving the functional cells to locations to abut the plurality of timing critical cells to form pattern-S for a selection of the plurality of timing critical cells without degrading timing performance of other timing paths. According to some embodiments, the method further includes: conducting clock tree synthesis and optimization through re-placement of the functional cells and the spare cells to form pattern-S with a plurality of timing critical cells to improve an overall timing performance of the layout design. According to some embodiments, conducting clock tree synthesis and optimization further include: moving the spare cells to locations to abut the plurality of timing critical cells to form pattern-S for each of the plurality of timing critical cells. According to some embodiments, conducting clock tree synthesis and optimization further comprises: moving the functional cells to locations to abut the plurality of timing critical cells to form pattern-S for a selection of the plurality of timing critical cells without degrading timing performance of other timing paths. According to some embodiments, the method further includes: conducting routing and optimization through re-placement of the functional cells and the spare cells to form pattern-S with a plurality of timing critical cells to improve an overall timing performance of the layout design. According to some embodiments, conducting routing and optimization further includes: moving the spare cells to locations to abut the plurality of timing critical cells to form pattern-S for each of the plurality of timing critical cells. According to some embodiments, conducting routing and optimization further includes: moving the functional cells to locations to abut the plurality of timing critical cells to form pattern-S for a selection of the plurality of timing critical cells without degrading timing performance of other timing paths. According to some embodiments, the method further includes: recording timing information induced by pattern-S back into the standard cell library.

According to some embodiments, a system for improving design performance of a layout design through placement of functional and spare cells by leveraging layout dependent effect (LDE) is disclosed. The system includes: a plurality of technology files associated with the layout design into an EDA system; a netlist associated with the layout design into the EDA system; a standard cell library containing pattern-S timing information of the functional cells and the spare cells; a unit for performing floorplan and spare cell insertion, wherein the spare cells are distributed uniformly across the floorplan; and a unit for conducting placement and optimization through re-placement of the functional cells and the spare cells to form pattern-S with a plurality of timing critical cells to improve an overall timing performance of the layout design. According to some embodiments, the unit for conducting placement and optimization further includes: a unit for moving the spare cells to locations to abut the plurality of timing critical cells to form pattern-S for each of the plurality of timing critical cells. According to some embodiments, the unit for conducting placement and optimization further includes: a unit for moving the functional cells to locations to abut the plurality of timing critical cells to form pattern-S for a selection of the plurality of timing critical cells without degrading timing performance of other timing paths. According to some embodiments, the system further includes: a unit conducting clock tree synthesis and optimization through re-placement of the functional cells and the spare cells to form pattern-S with a plurality of timing critical cells to improve an overall timing performance of the layout design. According to some embodiments, the unit for conducting clock tree synthesis and optimization further includes: a unit moving the spare cells to locations to abut the plurality of timing critical cells to form pattern-S for each of the plurality of timing critical cells. According to some embodiments, the unit for conducting clock tree synthesis and optimization further includes: a unit for moving the functional cells to locations to abut the plurality of timing critical cells to form pattern-S for a selection of the plurality of timing critical cells without degrading timing performance of other timing paths. According to some embodiments, the system further includes: a unit for conducting routing and optimization through re-placement of the functional cells and the spare cells to form pattern-S with a plurality of timing critical cells to improve an overall timing performance of the layout design. According to some embodiments, the unit for conducting routing and optimization further includes: a unit moving the spare cells to locations to abut the plurality of timing critical cells to form pattern-S for each of the plurality of timing critical cells. According to some embodiments, the system further includes: a unit for recording timing information induced by pattern-S back into the standard cell library. According to some embodiments, a timing critical cell is a cell whose location of deployment affects the timing of the system.

According to some embodiments, a computer-readable medium encoded with a data structure representing a layout designed by a process is disclosed. The process includes the steps of: importing a plurality of technology files associated with the layout design into an Electronic Design Automation (EDA) system; importing a netlist associated with the layout design into the EDA system; importing a standard cell library containing pattern-S timing information of the functional cells and the spare cells; performing floorplan and spare cell insertion, wherein the spare cells are distributed uniformly across the floorplan; and conducting placement and optimization through re-placement of the functional cells and the spare cells to form pattern-S with a plurality of timing critical cells to improve an overall timing performance of the layout design.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for improving design performance of a layout design, the method comprising:
    importing a standard cell library containing pattern-S timing information of functional cells and spare cells, wherein cells form pattern-S when cells of different active region heights are placed adjacent to each other; and
    conducting placement and optimization through re-placement of the functional cells and the spare cells to form pattern-S with a plurality of timing critical cells to improve an overall timing performance of a layout design.

2. The method of claim 1, wherein the conducting placement and optimization further comprises:
    moving the spare cells to locations to abut the plurality of timing critical cells to form pattern-S for each timing critical cell of the plurality of timing critical cells, wherein a timing performance of at least one timing critical cell of the plurality of timing critical cells is improved by the abutment of one spare cell of the spare cells to the at least one timing critical cell of the plurality of timing critical cells.

3. The method of claim 1, wherein the conducting placement and optimization further comprises:
    moving the functional cells to locations to abut the plurality of timing critical cells to form pattern-S for a selection of the plurality of timing critical cells, wherein the pattern-S is formed when a spare cell with a smaller active region height abuts a functional cell with a larger active region height resulting in improved timing performance of the functional cell.

4. The method of claim 1, further comprising:
importing a netlist associated with the layout design; and
conducting clock tree synthesis and optimization through re-placement of the functional cells and the spare cells to form pattern-S with a plurality of timing critical cells to improve an overall timing performance of the layout design, wherein pattern-S improves timing performance of the functional cells abutted by at least one of the spare cells with a smaller active region height.

5. He method of claim 4, wherein the conducting clock tree synthesis and optimization further comprises:
moving the spare cells to locations to abut the plurality of timing critical cells to form pattern-S for each timing critical cell of the plurality of timing critical cells.

6. The method of claim 4, wherein the conducting clock tree synthesis and optimization further comprises:
moving the functional cells within a predetermined threshold distance to locations to abut the plurality of timing critical cells to form pattern-S for a selection of the plurality of timing critical cells.

7. The method of claim 4, further comprising:
conducting routing and optimization through re-placement of the functional cells and the spare cells to form pattern-S with a plurality of timing critical cells to improve an overall timing performance of the layout design.

8. The method of claim 7, wherein the conducting routing and optimization further comprises:
moving the spare cells to locations to abut the plurality of timing critical cells to form pattern-S for each timing critical cell of the plurality of timing critical cells.

9. The method of claim 7, wherein the conducting routing and optimization further comprises:
moving the functional cells to locations to abut the plurality of timing critical cells to form pattern-S for a selection of the plurality of timing critical cells without degrading timing performance of other timing paths.

10. The method of claim 9, further comprising:
recording timing information induced by pattern-S back into the standard cell library.

11. A system for improving design performance of a layout design through placement of at least one functional cell and spare cells by leveraging layout dependent effect (LDE), the system comprising:
a standard cell library containing pattern-S timing information of at least one functional cell and the spare cells; and
a unit for conducting placement and optimization through re-placement of the at least one functional cell or the spare cells to abut at least one timing critical cell to form pattern-S to improve an overall timing performance of a layout design.

12. The system of claim 11, wherein the unit for conducting placement and optimization further comprises:
a sub-unit for moving the at least one spare cell of the spare cells to locations to abut the at least one timing critical cell to form pattern-S for each timing critical cell of the at least one timing critical cell.

13. The system of claim 11, wherein the unit for conducting placement and optimization further comprises:
a sub-unit for moving the at least one functional cell to locations to abut the at least one timing critical cell to form pattern-S for a selection of the plurality of timing critical cells without degrading timing performance of other timing paths.

14. The system of claim 11, further comprising:
a netlist associated with the layout design; and
a unit for conducting clock tree synthesis and optimization through re-placement of the at least one functional cell and the spare cells to form pattern-S with at least one timing critical cell to improve an overall timing performance of the layout design.

15. The system of claim 14, wherein the unit for conducting clock tree synthesis and optimization further comprises:
a sub-unit for moving at least one spare cell of the spare cells to locations to abut the at least one timing critical cell to form pattern-S for each timing critical cell of the at least one timing critical cell.

16. The system of claim 14, wherein the unit for conducting clock tree synthesis and optimization further comprises:
a sub-unit for moving the at least one functional cell to locations to abut the at least one timing critical cell to form pattern-S for a selection of the plurality of timing critical cells without degrading timing performance of other timing paths.

17. The system of claim 14, further comprising:
a unit for conducting routing and optimization through re-placement of the at least one functional cell and the spare cells to form pattern-S with the at least one timing critical cell to improve an overall timing performance of the layout design.

18. The system of claim 17, wherein the unit for conducting routing and optimization further comprises:
a sub-unit for moving at least one spare cell of the spare cells to locations to abut the at least one timing critical cell to form pattern-S for each timing critical cell of the at least one timing critical cell.

19. The system of claim 11, wherein a locational variation of the deployment of the at least one timing critical cell relative to other cells changes timing characteristics of the layout design.

20. A non-transitory computer-readable medium encoded with a data structure representing a layout design by a process, the process comprising:
importing a standard cell library containing pattern-S timing information of the at least one functional cell and spare cells; and
conducting placement and optimization through re-placement of the at least one functional cell and the spare cells to form pattern-S with at least one timing critical cell to improve an overall timing performance of a layout design.

* * * * *